United States Patent [19]

Miller

[11] Patent Number: 4,942,984
[45] Date of Patent: Jul. 24, 1990

[54] DRIPLESS SOLDER PASTE DISPENSER

[75] Inventor: Kenneth L. Miller, Indianapolis, Ind.

[73] Assignee: SCM Metal Products, Inc., Cleveland, Ohio

[21] Appl. No.: 269,872

[22] Filed: Nov. 10, 1988

[51] Int. Cl.$^5$ ............................................. G01F 11/06
[52] U.S. Cl. .................................... 222/309; 222/334; 222/571
[58] Field of Search .............................. 222/258–263, 222/309, 334, 386, 387, 389, 504, 559, 571

[56] References Cited

U.S. PATENT DOCUMENTS

| | | | |
|---|---|---|---|
| 3,601,988 | 8/1971 | Chermensky et al. | 222/334 |
| 3,622,050 | 11/1971 | Acton | 222/334 X |
| 3,806,084 | 4/1974 | Seese | 222/571 X |
| 4,095,722 | 6/1978 | Miller | 222/1 |
| 4,294,381 | 10/1981 | Miller | 222/1 |

FOREIGN PATENT DOCUMENTS

| | | | |
|---|---|---|---|
| 47-15070 | 5/1972 | Japan | 222/334 |
| 664440 | 2/1988 | Switzerland | 222/334 |

Primary Examiner—Kevin P. Shaver
Attorney, Agent, or Firm—Lieberman, Rudolph & Nowak

[57] ABSTRACT

The present invention relates to a dispensing device comprising a housing containing at least three pressure chambers. The upper pressure chamber being separated from the middle pressure chamber by a reciprocating upper piston composed of a head and a stem. A lower piston is reciprocally positioned between the middle and lower pressure chambers such that pressurization of the lower pressure chamber exerts upward pressure on the lower piston and pressurization of the middle pressure chamber exerts downward pressure. The lower piston is fixed to a reciprocating rod which has a dispensing rod tip. The dispensing rod tip is slidably situated within a dispensing tube which has a tube opening for introduction of a dispensible material therethrough. The dispensing rod tip is reciprocatable between an upward, downward and intermediate position. In its upward position, a tube opening is non-occluded, thereby allowing the dispensible material to enter a dispensing tube. In its downward position, the tube opening is occluded and positive pressure is exerted on the dispensible material within the dispensing tube. In its intermediate position, the tube opening is occluded without exerting positive pressure on any dispensible material within the dispensing tube. The upward movement of the dispensing rod tip from the downward position to the intermediate position creates negative pressure in the dispensing tube which snuffs back any dispensible material within the dispensing tube.

5 Claims, 3 Drawing Sheets

DRIPLESS SOLDER PASTE DISPENSER

BACKGROUND OF THE INVENTION

The present invention relates to an apparatus which is useful for rapidly dispensing precise quantities of a viscous liquid, e.g., solder paste, in exact locations. In the past, numerous such dispensing devices have been described in various publications. However, none of the devices to date has been effective at dispensing particularly small quantities or "shots" of solder paste, e.g., about 0.5 cc, or dispensing these shots in a particularly rapid fashion, e.g., up to about 3 shots-per-second.

Solder paste presents a particular challenge to those skilled in the dispensing art due to its non-homogenous nature, and due to its mixture of miniature solder solids (typically metal particles of about 40 micron diameter size) which are suspended in a solution of flux, binders, solvent and other components.

Most modern dispensers are known to place a drop of solder in the desired location through the use of computer-controlled robot systems which accurately position the dispenser head and activate the dispenser to eject a precise amount of solder paste.

Among the types of devices used in the past are air-driven syringes, peristaltic pumps, gear displacement arrangements and positive-displacement pumps.

Air driven syringes usually rely upon a syringe having a fine diameter tip to dispense the shot. The syringe is pressurized intermittently, usually to about 50 PSI for up to three seconds. This forces the shot of solder paste out of the metal dispensing tip onto the board surface. Unfortunately, this method of dispensing solder paste is rather slow, and pressurizing the solder paste tends to cause the particulate solids, flux and binders to separate. Under pressure, the more fluid components contained therein tend to separate and flow more readily, leaving behind some of the particulate metal. Separation of the paste in this fashion tends to clog the dispensing tip, since the particulate metal spheres may melt under high pressure, forming a metal mass which is too large to pass through the fine diameter of the dispensing tip.

The peristaltic pump type of solder paste dispensing device seeks to avoid this separation hazard by employing a low pressure system with a relatively stiff piece of tubing, usually comprised of plastic, which is clamped at each end. The upper clamp is opened, allowing the tube volume to fill with solder paste. The upper clamp is then tightened, and the lower clamp is released. The upper clamp is then simply slid down the tubing, causing a shot of solder to be squeezed out of the lower opening of the tube. However, peristaltic pumps do not dispense precise quantities of solder paste, since the volume of the tube changes with repeat usage. Eventually the tube must be replaced since the tube wall tends to develop cracks.

The positive displacement pump is in many ways the most effective present method of dispensing a precise amount of solder. The pump tends to apply the least amount of stress to the solder paste, thereby avoiding the separation of the solder paste into its components. Moreover, positive displacement to date has given the most precise shot sizes, since the volume of the displacement rod remains constant. However, positive displacement by itself is unacceptable at high speeds, particularly when the viscosity of the solder paste is low, which allows paste to drip out of the dispensing tip.

Due to this dripping, a variable amount of solder may be dispensed. Increasing pressure in the standard positive displacement system may cause the solder to separate into its component parts, thereby leading to jamming or melting of the metal particles which results in clogging as previously described.

One hand held solder paste dispenser manufactured by Techcon Systems, Inc., a division of Creative Automation, currently on the market uses a positive displacement pump to deliver shot sizes as small as about 0.024 inches in diameter. The dispensing tip incorporated therein relies upon a Luer-lock system, and is approximately 4 cms long. The dispenser requires positive pressure of around 10 psi to deliver solder shots. About 3 shots per second can be delivered.

A similar automated device, manufactured by Creative Automation, uses a positive pressure pump to deliver shot sizes about the same size as the manual dispenser described above.

A positive pressure dispensing apparatus is described in U.S. Pat. No. 3,806,084, issued to Seese and entitled "Improved Valve Dispensing Apparatus." The Seese patent describes a dispensing apparatus comprising a housing defining a tubular chamber which communicates with a material inlet and exit port, and a unitary valve member defining a passageway. The valve member is slidable in the chamber. The Seese patent describes a wiping action on the chamber wall by the valve member during its return stage, which causes a suction force on undispensed material, thereby preventing the solder from dripping out of the exit port.

U.S. Pat. No. 4,095,722 issued to Miller on June 20, 1978, and entitled "Dripless Dispenser and Methods of Dispensing a Flowable Material", describes a related positive pressure dispenser, using a bore and a pinch-off tube fitted within the bore. The solder paste reservoir is connected to one end of the pinch-off tube, and at least one dispensing nozzle or needle is removably coupled to the other end of the tube. The pinch-off tube is squeezed to dispense a shot of solder. Release of the squeezed pinch-off tube causes the residual solder paste in the pinch-off tube to be drawn back away from the dispensing tip. This reverse flow of solder paste ("snuff-back"), is useful for preventing dripping. However, until the present invention, snuff-back was not available in combination with the physical obstruction of the solder paste reservoir tube using the side wall of the dispensing rod, thereby enhancing shot size control and placement accuracy.

U.S. Pat. No. 4,294,381, issued to Miller on Oct. 13, 1981, and entitled "Dispenser for and a Method of Dispensing a Material from a Non-Pressurized Material Reservoir" discloses a solder paste dispenser having a non-pressurized reservoir with a bore therethrough. The reservoir is connected to one end of a pinchoff tube, while at least one nozzle or needle is attached to the other end of the tube. As above, the tube is squeezed to force solder paste out of the needle, and released to draw any residual solder paste away from the dispensing tip to effect snuff-back. While this snuff-back feature is useful, it may not completely prevent solder paste drippage when particularly low viscosity solder paste is dispensed. Consequently, one object and advantage of the present invention is to combine the benefits and preferred features of positive displacement dispensers with a syringe-type dispenser.

Another object and advantage of the present invention is to maximally enhance and supplement the snuff-back of the residua solder paste through the use of a dispensing rod, the side wall of which occludes the reservoir tube when in its "down", dispensing position, thereby more precisely regulating shot size and facilitating shot dispensing speed and placement. The present invention uses a very short positive pressure flow distance e.g., 2 cm., minimizing the separation of solids.

SUMMARY

A dispensing device comprising a housing containing an upper, middle and lower pressure chambers, each of said chambers capable of being pressurized through at least one pressure injection port, said upper pressure chamber being separated from said middle pressure chamber by a reciprocatable upper piston. The upper piston has a head and a stem. The cross-sectional dimension of the head is larger than that of the stem and essentially conforms to the inside dimension of the upper pressure chamber. Pressurization of the upper chamber exerts positive downward pressure on the upper piston and the stem of the top piston being coincident with the upper surface of the middle pressure chamber meets the upper surface of a lower piston which is reciprocatably positioned between the middle and lower pressure chambers The reciprocatable lower piston is such that pressurization of the lower pressure chamber exerts upward pressure on the lower piston and positive pressure in the middle air pressure chamber exerts positive downward pressure on the lower piston. The lower piston is fixedly and co-axially attached to a reciprocating rod which has a dispensing rod tip. The dispensing rod tip is slidably situated within the lumen of a dispensing tube which has a reservoir tube opening for introduction of a dispensible material therethrough. The dispensing rod tip is spacially related to the reservoir tube opening such that said reservoir tube opening may be occluded by said dispensing reciprocation of said reciprocating rod, dispensing tip and lower piston. The dispensing rod tip is reciprocatable between upward, downward and intermediate positions. In its upward position, the reservoir tube opening is non-occluded thereby allowing the dispensible material to enter the dispensing tube. In its downward position, positive pressure is exerted on the dispensible material within the dispensing tube and the reservoir tube opening is occluded. In its intermediate position, the reservoir tube opening is occluded without positive pressure exerted on any dispensible material within the dispensing tube. The upward movement of the dispensing rod tip from the downward position to the intermediate position creates negative pressure in the dispensing tube which snuffs back any dispensible material within the dispensing tube.

DETAILED DESCRIPTION

Figure 1:
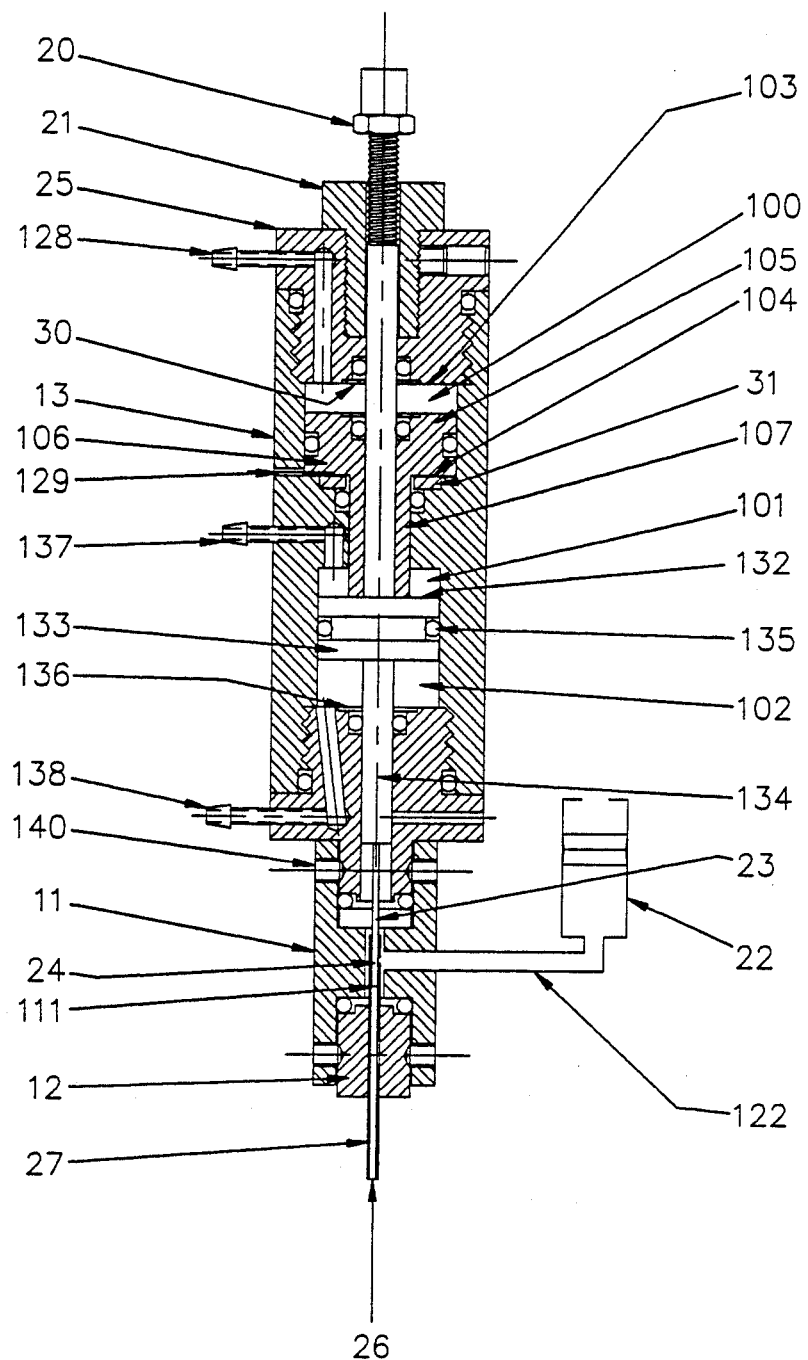
FIG. 1—illustration of the preferred embodiment of the invention in the resting or intermediate position.

The dispensing device described herein and illustrated in the figures typically encompasses a housing 13 and optionally a lower housing 11. The upper housing contains a plurality of air pressure chambers, each of which is pressurized and depressurized in accordance with the invention. Contained in the upper housing in a preferred embodiment of the invention are three pressure chambers, an upper pressure chamber 100, a middle air pressure chamber 101 and a lower pressure chamber 102. The upper air pressure chamber is defined by the inner surface of the upper chamber housing wall. It also has a fixed upper surface 103 and a lower surface. The lower surface is comprised of the top surface of the top piston in its downward position and fixed lower surface area 104. The top piston moves in response to increases and decreases in pressure within the upper pressure chamber.

The upper pressure chamber is pressurized through upper pressure injection port 128, and depressurized through upper pressure release port 129.

Contained within the upper chamber is upper piston 105. The upper piston has a head 106 which has a diameter slightly less than the inner diameter of the upper chamber. The upper piston also has a stem 107, which is situated below the head. The upper piston slides up and down within the upper pressure chamber. In its downward position, the bottom surface of the upper piston stem contacts the upper surface of lower piston 132 as further described below.

The upper piston reciprocates up and down within the upper pressure chamber in response to gas pressure and mechanical pressure. More particularly, gas pressure (e.g., air pressure) may be exerted above the top piston by pressurizing the upper pressure chamber through the upper pressure injection port. This causes the upper piston to travel downward. The upper piston travels downward until the lower surface of the stem contacts the upper surface of the lower piston, or until the underside of the head contacts the fixed lower surface area of the upper pressure chamber.

When mechanical pressure is exerted upward against the stem of the top piston by the lower piston head, the upper piston is forced upward. To facilitate the upward travel of the upper piston head, the positive pressure within the upper pressure chamber is interrupted, so that upward mechanical pressure pushes the upper piston in an upward direction. Passive air intake occurs as the upper piston travels upward through passive air vent 129. Passive air outflow occurs through the passive air vent when the upper piston travels downward.

Travel of the upper piston in an upward direction is limited by the inner top surface of the upper air chamber within the upper pressure chamber. Top chamber stop 30 may be present to minimize any impact which occurs when the top piston travels upward and reaches the inner upper surface of the upper pressure chamber.

Similarly, lower stop 31 may be present to minimize the impact between the underside of the upper piston head and the fixed lower surface area of the upper pressure chamber.

The middle pressure chamber 101 and the lower pressure chamber 102, in the preferred embodiment of the invention, are each pressurized (and depressurized) by the middle pressure injection port 137 and lower pressure injection port 138, respectively. As is readily apparent from the drawings, the middle and lower air pressure chambers may actually be one continuous chamber, divided by the lower piston head 133, which is fixedly attached to a reciprocating drive rod 134. The lower piston head is of a dimension which essentially conforms to the inner dimension of the middle and lower air pressure chambers. The lower piston head may be slidably sealed to the inner surface of said chambers by a pressure seal 135, e.g., an O-ring.

As described with respect to the upper pressure chamber, upward travel of the lower piston head is limited by the bottom surface of the stem of the upper piston. Downward travel of the lower piston head may be limited by the bottom inner surface of the lower pressure chamber. A bottom piston stop 136 may be placed therein to minimize impact between the bottom surfaces of the lower piston head and the lower pressure chamber respectively.

The middle pressure chamber is pressurized through the middle injection port 137. Pressurization of the middle pressure chamber causes the lower piston to travel downward.

The lower pressure chamber is pressurized through the lower pressure injection port 138. This causes the lower piston to travel upward. By reciprocating upward and downward in this manner, the lower piston head causes the reciprocating drive rod and the dispensing rod tip to which it is fixed to reciprocate.

The lower portion of the reciprocating drive rod is housed within a knob portion 140 of the upper housing. The knob portion attaches to the lower housing 11. Lower housing 11 may be threaded to receive a threaded male portion of the upper housing, or may be snug-mounted and attached to the upper housing male portion through a plurality of set screws.

The reciprocating drive rod is contained within the upper housing. To the lowermost surface of the reciprocating drive rod is attached a dispensing rod tip 23. The upper portion of the dispensing rod tip reciprocates within the knob portion of the upper housing. The lower portion of the dispensing rod travels up and down within a dispensing tube 27 in conjunction with the movement of reciprocating drive rod.

The dispensing tube 27 is housed within a tube holder 12. The tube holder fits within a cavity 111 on the bottom portion of the lower housing. The tube holder may be threaded on the exterior surface thereof, or simply snug mounted to the lower housing and held in place by set screws.

The dispensing tube forms a lumen, the top portion of which receives the lowermost portion of the dispensing rod. The wall of the dispensing tube has a reservoir tube opening 24 therein, through which dispensible semi-solid material enters the dispensing tube.

Located to the side of the lower housing is a material reservoir 22, used to contain semi-solid material for dispensing. Connecting the reservoir and the dispensing tube is reservoir tube 122. Semi-solid material travels from the reservoir through the reservoir tube and the reservoir tube opening. The material enters the dispensing tube, and is ultimately pushed downward through the lumen of the dispensing tube by the dispensing rod tip. The semi solid material is dispensed through outlet port 26.

The dispensing device is particularly well adapted to operate as a three stage system, as described in detail below.

The first stage, shown in FIG. 1, is referred to herein as the "resting stage". The resting stage is characterized by having the reservoir tube opening occluded by the side of the dispensing rod tip. Positive pressure may be present in the upper and lower pressure chambers. Positive pressure in the upper pressure chamber forces the upper piston head downward, until the bottom surface of the stem is in contact with the top surface of the lower piston head. This counteracts the positive pressure in the lower pressure chamber as well as the resultant upward force generated on the reciprocating drive rod.

In this fashion, the dispensing rod tip is simply immobilized. The side wall blocks the reservoir tube opening, Preventing semi-solid material from entering the lumen of the dispensing tube from the reservoir tube.

In this resting stage, no dispensing of material occurrs. No additional semi-solid material enters the dispensing tube. This stage is thus advantageous in that dripping from the dispensing tip is minimized or eliminated.

To dispense a shot of semi solid material, the positive pressure in the upper pressure chamber is reduced. The middle pressure chamber is not yet pressurized. The reduction in upper chamber pressure enables the positive pressure in the lower chamber to force the lower piston upward, which in turn mechanically pushs the reciprocating drive rod and dispensing rod tip upward. This movement of the lower piston also forces the upper piston to travel upward due to the upward force generated by the lower piston.

Figure 2:
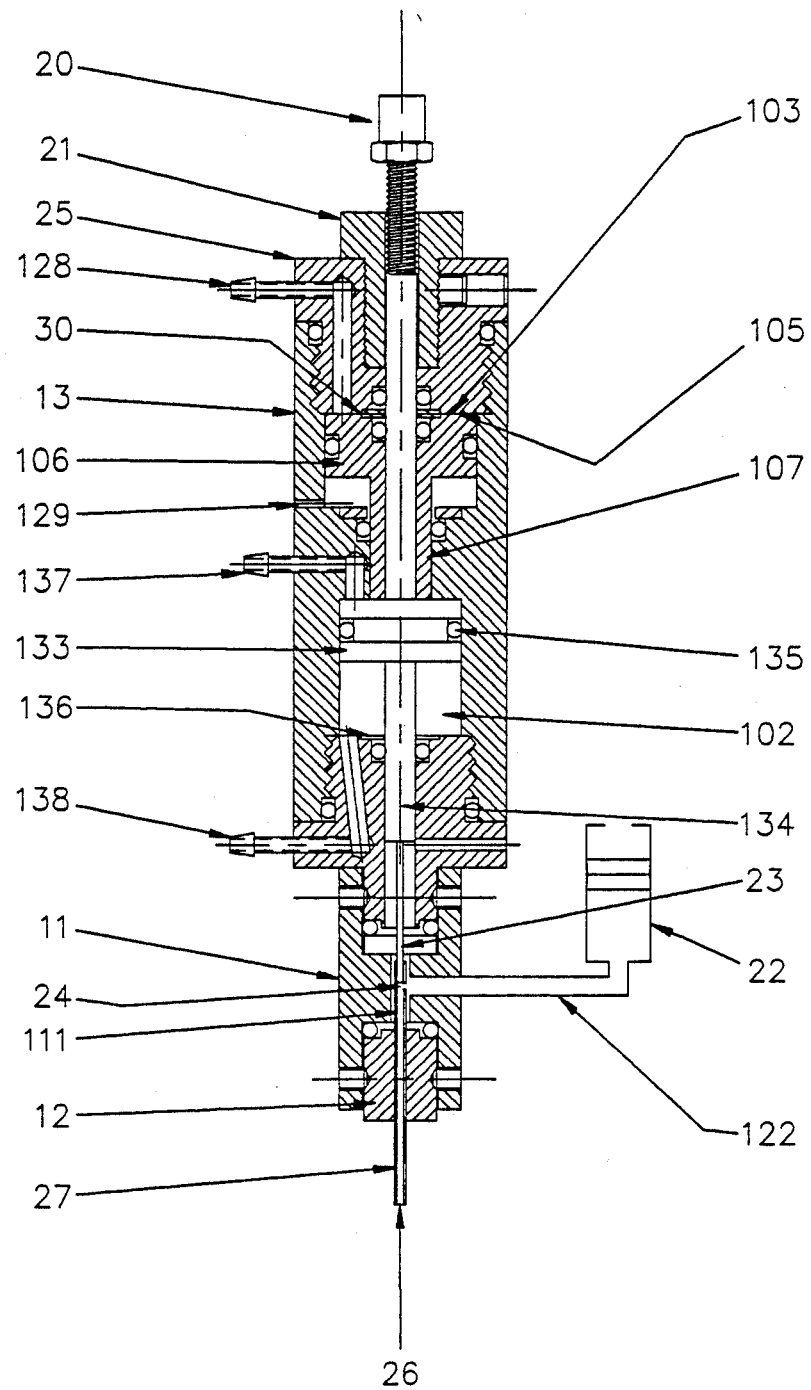
FIG. 2—illustration of the preferred embodiment of the invention in the upward position.
Figure 3:
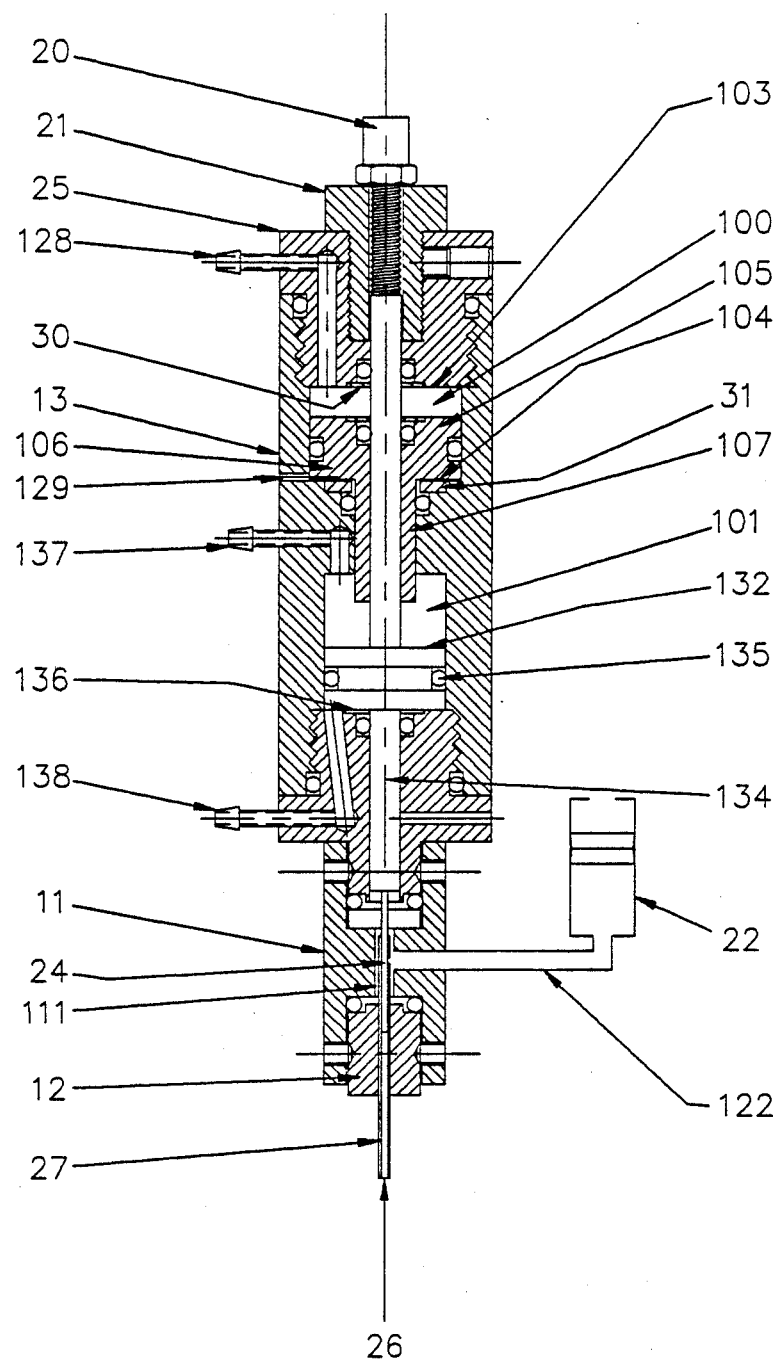
FIG. 3—illustration of the preferred embodiment of the invention in the downward or dispensing position.

As the dispensing rod tip is drawn upward, the reservoir tube opening is unblocked and semi-solid material flows into the dispensing tube from the reservoir. FIG. 2. The upper and middle pressure chambers are then pressurized and the reciprocating drive rod travels downward as shown in FIG. 3 for a predetermined distance coincident with the long axis of the housing. This in turn pushes the dispensing rod tip down, occluding the reservoir tube opening and dispensing a precise amount of semi-solid material through the outlet port. After the material is dispensed, the middle pressure chamber is depressurized and the lower pressure chamber is pressurized. This moves the lower piston, the reciprocating drive rod and the dispensing rod tip upward, thereby returning the system to the resting or intermediate stage of FIG. 1. Upward travel of the dispensing rod tip from its position in FIG. 3 to its position in FIG. 1 causes any semi-solid material within the dispensing tube to be "snuffed back" due to the resulting negative pressure and capillary action within the dispensing tube.

While the drive rod and tip are situated as shown in FIG. 1 and while the snuff back is in effect, the dispensing device described herein may be shifted to a new site for a shot of material to be dispensed. Alternatively, the application site may be moved to a point where a new application of material or solder paste is desired.

The improved solder dispensing device described herein can be operated using positive and negative pressure through the pressure inlets, or by simply reducing the positive pressure.

Numerous other features and elements may be included in the invention described herein, and are included in the preferred embodiments of this invention. For example, piston travel adjustment screw 20 is an optional feature, useful for modifying the distance traveled by the reciprocating drive rod and dispensing rod tip, and ultimately useful for adjusting the amount of semi solid material dispensed. When piston travel amount of semi solid material dispensed. When piston travel adjustment screw 20 is featured in the embodiment of the invention, the volume adjustment screw 25, useful for adapting the volume of the upper pressure chamber may also be included. Travel of the reciprocating and dispensing rods may also be limited or controlled through the use of piston travel stops 30 and 31 as previously described. It is also to be noted that the lower piston head is typically smaller in overall dimension than the upper piston head, thereby limiting downward travel of the upper piston. The relative dimensions between the upper and lower piston heads may be adapted such that a predetermined pressure will be adequate to cause different piston forces. The small head will therefore generate less force with a given chamber pressure than a large head.

The upper housing may optionally utilize a top cap 21 useful for maintaining air pressure within the uppermost pressure chamber.

The improved dispensing device described herein is particularly well suited for repeated dispensing of minute quantities of solder. For example, discrete quantities of solder paste ranging from about 3/1000's to about 10/1000's of a cubic inch in volume, which is particularly useful in the preparation of circuit boards.

Another improved optional feature of the device described herein is that the exit end of the dispensing tip may be notched. This facilitates placement of the shot of solder paste in a precise location on circuit board. The notch may be in the shape of a step cut, and the shot is deposited in the area designed by the diameter of the outlet port By notching the dispensing tip of the needle, a fixed distance is repeatedly realized when the dispensing tip and outlet port are lowered to the surface of the circuit board for dispensing a shot of solder paste on the same circuit board.

While the preferred embodiments of the invention have been described in detail, numerous alternative embodiments are contemplated as being within the scope of the claims. Consequently, the scope of the claims is not to be limited thereby.

I claim:

1. A dispensing device comprising:
   a housing containing upper, middle and lower pressure chambers, each of said chambers being pressurizable;
   an upper piston separating the upper and middle pressure chambers, the upper piston having a head and a stem, the cross-sectional dimension of the head being larger than that of the stem and essentially conforming to the inside dimension of the upper pressure chamber, the stem of said upper piston being coincident with the upper surface of the middle chamber;
   a lower piston reciprocatably positioned between the middle and lower pressure chambers, the lower piston being such that pressurization of the lower pressure chamber exerts upward pressure on the lower piston, and pressurization of the middle pressure chamber exerts downward pressure on the lower piston;
   a reciprocating rod fixedly attached to the lower piston;
   a dispensing rod tip attached to the reciprocating rod so as to reciprocate among an upward position, a downward position and an intermediate position with reciprocation of the lower piston and reciprocating rod;
   a dispensing tube having at ube opening through which a dispensible semi-solid material may be introduced, the dispensing rod tip being slidably situated within the lumen of the dispensing tube and spacially related to the tube opening such that said tube opening is non-occluded when the dispensing rod tip is in the upward position, thereby allowing the dispensible semi-solid material to be introduced into the dispensing tube, and said tube opening is occluded when the dispensing rod tip is in the downward position and the intermediate position, the dispensing rod tip being spacially related to the dispensing tube such that when the dispensing tube contains the dispensible material and the dispensing rod tip moves from its downward position to its intermediate position, negative pressure is exerted on the dispensible material causing the material to be snuffed back into the dispensing tube.

2. A devise of claim 1 which further comprises a reservoir for storing the dispensable semi-solid material and a reservoir tube connecting the reservoir to the tube opening through which the dispensable semi-solid material is introduced.

3. A devise of claim 2, further comprising a piston travel adjustment screw located above the reciprocating rod and adjustably attached to the housing, said screw capable of modifying the distance traveled by the reciprocating rod during reciprocation and thereby modifying the amount of dispensable semi-solid material dispensed.

4. A devise of claim 3 which further comprises a volume adjustment screw capable of adjusting the volume of the upper pressure chamber, and a top chamber stop located on the inner upper surface of the upper pressure chamber, a lower chamber stop located on the inner lower surface of the upper pressure chamber, and a bottom piston stop located on the inner lower surface of the lower pressure chamber.

5. A dispensing device for dispensing a semi-solid material comprising:
   a housing containing at least three pressure chambers, each of which being pressurizable and depressurizable through at least one pressure injection port;
   a plurality of pistons, each of which is in one of the pressure chambers or between two of the pressure chambers;
   a reciprocatable drive rod, pistons and pressure chambers being situated with respect to one another so that pressurization and depressuization of the chambers produce reciprocation of the pistons and the drive rod;
   a dispensing rod tip attached to an end of the drive rod;
   a dispensing tube having a tube opening through which the semi-solid material may be introduced, the tube being so positioned that the dispensing rod tip is slidably situated within the lumen of the dispensing tube and the tube opening may be occluded and non-occluded by movement of the dispensing rod tip; and
   means for introducing the semi-solid material into the dispensing tube through the tube opening;
   the pressure chambers, pistons, drive rod, and dispensing tip being so positioned that the dispensing rod tip is capable of reciprocating movement among at least three positions in the dispensing tube, one position causing the tube opening to be non-occluded and allowing introduction of the semi-solid material into the dispensing tube and movement of the tip between two other positions causing negative pressure in the dispensing tube to be exert on the semi-solid material in the dispensing tube.

* * * * *